United States Patent [19]
Mellen

[11] Patent Number: 5,249,767
[45] Date of Patent: Oct. 5, 1993

[54] TABLE LEVELING WEDGE

[76] Inventor: Floyd E. Mellen, 8417 Pacific St., Omaha, Nebr. 68114

[21] Appl. No.: 956,278

[22] Filed: Oct. 5, 1992

[51] Int. Cl.⁵ .................................................. A47F 5/14
[52] U.S. Cl. .................................. 248/188.2; 254/104
[58] Field of Search ............... 248/188.2, 188.3, 501, 248/502, 316.2; 52/126.1; 254/104; 182/200, 41

[56] References Cited

U.S. PATENT DOCUMENTS

| | | | |
|---|---|---|---|
| 62,332 | 2/1867 | Heyden | 248/316.2 X |
| 464,921 | 12/1891 | Carr | 254/104 |
| 1,624,243 | 4/1927 | Hoff et al. | 254/104 |
| 1,915,320 | 6/1933 | Jones . | |
| 2,166,444 | 7/1939 | Kinninger et al. | 254/104 |
| 2,524,961 | 10/1950 | Cramer, Jr. . | |
| 2,654,420 | 10/1953 | Rogers | 248/188.2 |
| 3,030,730 | 4/1962 | Costar . | |
| 3,138,963 | 6/1964 | Prince | 254/104 |
| 3,171,632 | 3/1965 | Jines | 254/104 |
| 3,185,442 | 5/1965 | Hemphill . | |
| 3,452,663 | 7/1969 | Machtig . | |
| 3,595,513 | 7/1971 | Rehlaender | 248/188.2 X |
| 3,993,275 | 11/1976 | Lucas . | |
| 4,135,335 | 1/1979 | Jensen . | |
| 4,281,739 | 9/1981 | Keiser . | |
| 4,304,318 | 12/1981 | Webb . | |
| 4,688,761 | 8/1987 | Wilcox | 254/104 |
| 4,830,320 | 5/1989 | Bellows . | |
| 4,870,440 | 9/1989 | Frost | 248/188.2 X |

Primary Examiner—Ramon O. Ramirez
Assistant Examiner—Korie H. Chan
Attorney, Agent, or Firm—John A. Beehner

[57] ABSTRACT

A table leveling wedge for eliminating wobble from tables with or without glides, includes a solid block of material having an inclined top surface. A cavity formed in the top surface extends from the forward end of the block to an extent adjacent the rearward end, which cavity is defined an inclined support surface and a pair of longitudinally extended and transversely spaced apart abutment surfaces adapted to confine a table glide between them. The portions of the wedge transversely outwardly of the abutment surfaces extend forwardly of the cavity support surface to partially define a pair of feet which are advantageously used to guide a table glide between them and center the wedge relative to a glide to be supported on the wedge.

11 Claims, 3 Drawing Sheets

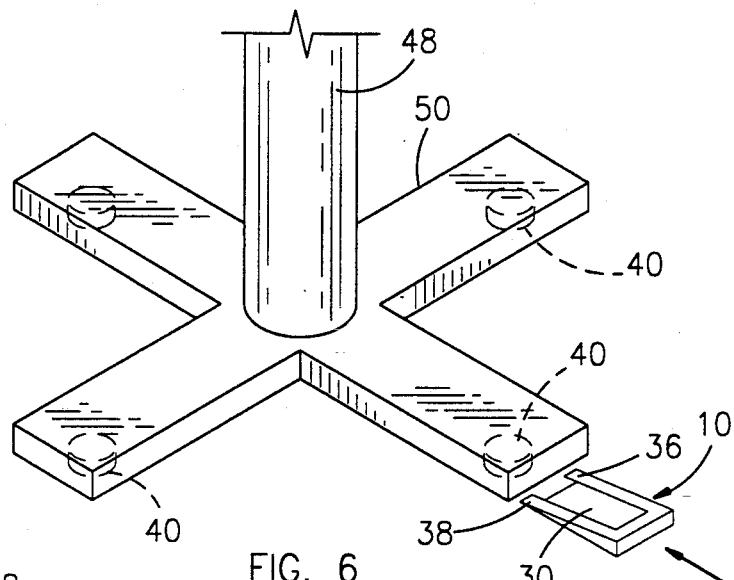
FIG. 6
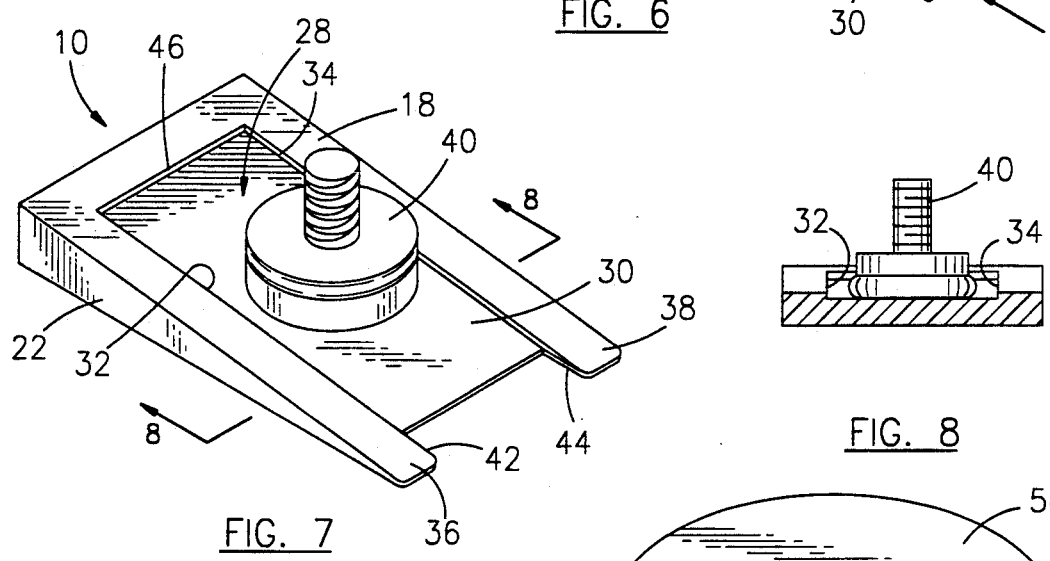
FIG. 7
FIG. 8
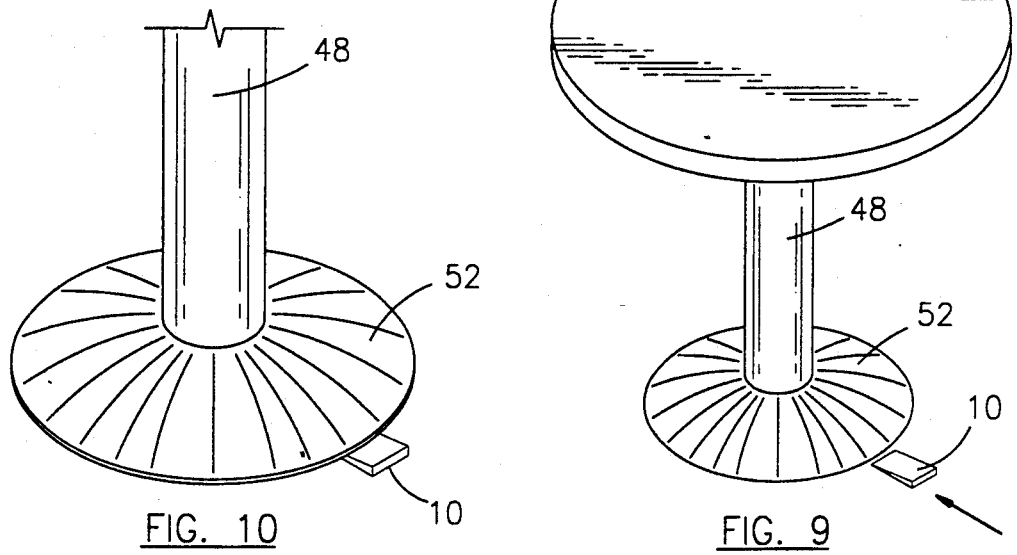
FIG. 10
FIG. 9

TABLE LEVELING WEDGE

BACKGROUND OF THE INVENTION

1. Technical Field

This invention relates generally to a table leveling wedge and more particularly to a wedge having forwardly protruding spaced apart feet for guiding it below a table glide and a longitudinally extended top cavity for receiving the table glide and laterally confining it on the wedge.

2. Description of the Prior Art

In restaurants, in particular, wobbly tables are a problem both as an annoyance for customers and as a detraction from the table's function of supporting dinnerware and other articles on it. Whether floors are made of wood, tile, concrete, terrazzo, or any other material, the floor surface is seldom perfectly flat. For this purpose, the legs or pedestals of many tables are provided with glides which are typically mounted by screw threads to enable the glides to be vertically adjusted for stable support of the table on floor surfaces which are not perfectly level. The difficulty with conventional table glides is that it is a time consuming process to properly adjust them. In a busy restaurant setting, time is simply not available to make such adjustments each time a table is moved. Such adjustments would likely require that the table be tipped up or turned down on its side for access to the glide with a tool if necessary. Accordingly, such adjustments may be an unacceptable disruption in any event. Finally, even if the table glides are properly adjusted once, readjustment would be necessary each time the table is moved to accommodate combining tables or different table arrangements.

Even on level surfaces, adjustment may be necessary when combining tables to level them relative to one another. When two tables are moved together, they not only need to be stabilized at that new position, but also leveled with one another to eliminate a ledge at the joint since it may be necessary for a patron to be seated at the junction where two tables meet.

A primary object of the invention, therefore, is to provide an improved table leveling wedge.

Another object is to provide a simple yet effective table leveling wedge which may be quickly and conveniently installed below a wobbly table to stabilize it.

Another object is to provide a table leveling wedge which affords lateral securement as well as vertical support so that a table glide will not be bumped off of the wedge.

Another object is to provide a table leveling wedge with a longitudinally extended cavity effective for supporting a table glide substantially throughout the length of the wedge.

Another object is to provide a table leveling wedge of a size and shape to accommodate most minor adjustments with a single wedge.

Another object is to provide a table leveling wedge which is simple and rugged in construction, economical to manufacture and efficient in operation.

In an effort to avoid wobbly tables, restaurants have been known to use cardboard matches or plain wood wedges below selected table glides for leveling and stabilizing wobbly tables. The matchbooks are somewhat compressible and aesthetically detract from what otherwise may be a very elegant restaurant atmosphere. The common wood wedge provides vertical support, but no lateral support. Accordingly, if the table is bumped or moved slightly, it can be moved off of either of these supports. Furthermore, it is difficult to insert a common wedge under the glides of a table pedestal because the precise position of the table glide cannot be seen unless the waiter gets down on hands and knees with his eyes near the floor.

Manufactured wedges such as that shown in Bellows, U.S. Pat. No. 4,830,320, suffer from the same lack of lateral support and the small cavity of that device is effective only if the needed vertical adjustment corresponds with the position of the cavity on that device.

SUMMARY OF THE INVENTION

The table leveling wedge of the present invention is effective for eliminating wobble from tables with and without glides on the table legs or pedestal. The wedge comprises a solid block of material having a top surface which is inclined upwardly and rearwardly relative to the bottom surface, with a cavity formed in the top surface and extending from the forward end of the block to an extent adjacent the rearward end. The cavity is defined by an inclined support surface and a pair of longitudinally extended and transversely spaced apart abutment surfaces adapted to confine a table glide between them. The portions of the top surface situated transversely outwardly of the abutment surfaces extend forwardly of the support surface to partially define a pair of feet for receiving a table glide between them and generally centering the wedge relative to a glide to be supported on the wedge.

The support surface of the cavity is preferably parallel to the top surface of the wedge. Likewise, the cavity may stop short of the rearward end of the wedge where a transverse abutment surface would be presented for engaging a table glide and preventing the glide from being bumped off the rearward edge of the wedge. Inner surfaces of the forwardly protruding feet may be tapered forwardly and outwardly to further help guide a table glide between them.

BRIEF DESCRIPTION OF THE DRAWINGS

FIG. 6 is a partial perspective view of a table pedestal with the wedge of the invention being inserted below a table glide;

FIG. 7 is an enlarged perspective view of a table glide on the wedge of the invention;

FIG. 8 is a sectional view taken along line 8—8 in FIG. 7;

FIG. 9 is a perspective view showing the wedge being inserted below the round base of a table pedestal;

FIG. 10 is an enlarged partial perspective view showing the wedge in place below a circular table base;

DESCRIPTION OF THE PREFERRED EMBODIMENT

Figure 1:
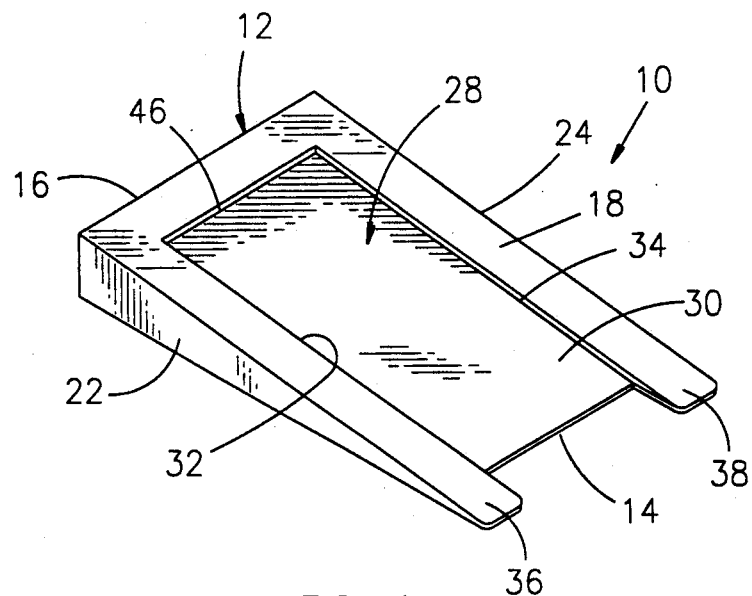
FIG. 1 is a perspective view of the table leveling wedge of the invention.
Figure 2:
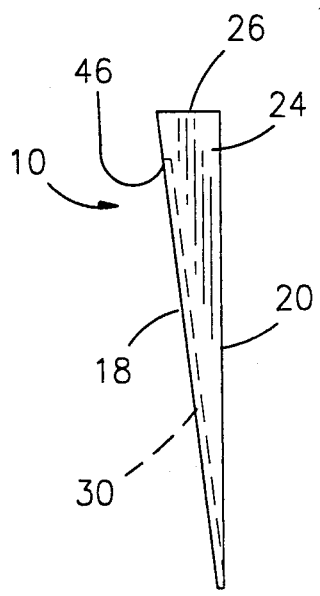
FIG. 2 is a side elevational view of the wedge.
Figure 3:
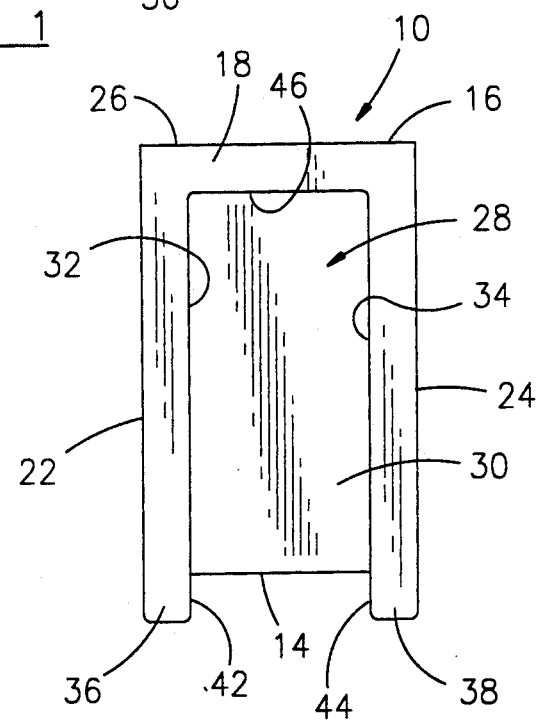
FIG. 3 is a top plan view of the wedge.
Figure 4:
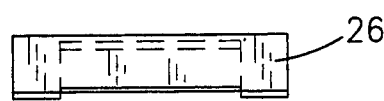
FIG. 4 is a rear elevational view of the wedge.
Figure 5:
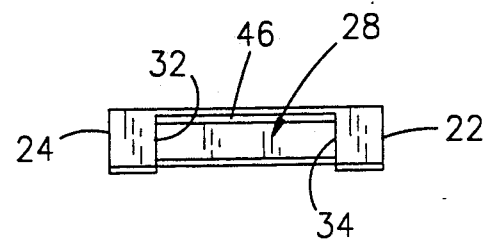
FIG. 5 is a front elevational view of the wedge.

The table leveling wedge 10 of the present invention is illustrated in FIGS. 1–5 as a solid block 12 of material having forward and rearward ends 14 and 16, top and bottom surfaces 18 and 20 opposite sides 22 and 24 and a rear surface 26. The top surface 18 is inclined upwardly and rearwardly relative to bottom surface 20, as shown best in FIG. 1.

A cavity 28 is formed in top surface 18 and extends from the forward end 14 of the block to an extent adjacent to rearward end 16. The cavity 28 is defined by an inclined support surface 30 and a pair of longitudinally extended and transversely spaced apart abutment surfaces 32 and 34 which are adapted to confine a table glide between them.

Top surface 18 and cavity support surface 30 are both preferably planar and parallel. Since support surface 30 is situated below top surface 18 by the height of abutment surfaces 32 and 34, the forward end of support surface 30 terminates somewhat short of the forward end of top surface 18. Accordingly, the portions of the wedge transversely outwardly of the abutment surfaces 32 and 34 extend forwardly of support surface 30 to define a pair of feet 36 and 38. These feet are useful for guiding the wedge below a table glide by receiving the glide between them and generally centering the wedge relative to the glide 40, as shown in FIG. 7. At least the inner surfaces of 42 and 44 of feet 36 and 38 may be tapered forwardly and outwardly to help receive a glide 40 between them.

In the preferred embodiment, the cavity 28 does not extend the full length of wedge 10, but rather terminate short of rearward end 16 at a transversely extended abutment surface 46 which is preferably spaced forwardly from rear surface 26 by the same dimension that abutment surfaces 32 and 34 are spaced from the adjacent sides 22 and 24 of the wedge. Transverse abutment surface 46 is helpful for preventing a table glide from being bumped off the rearward end of the wedge. Rather, if a table is bumped in that direction, the glide would simply engagement the abutment surface 46 and move the wedge with the table so that the glide remains supported on the wedge.

Wedge 10 should be of a size and shape to receive and support most common table glides at the relatively small heights required for leveling most tables. A preferred range of dimensions for the wedge include a width of between 3 and 8 centimeters, a length of between 6 and 12 centimeters and a height at the rearward end of between ½ and 2 centimeters. The height of the abutment surfaces 32 and 34 is preferably between 1 and 5 millimeters. A cavity width of 3 centimeters will accommodate most common table glides.

The table leveling wedge 10 is preferably formed of a high friction material which will not slip on the floor surface when it is in use. It is preferably formed by injection molding with a relatively stiff, yet flexible rubber-like material such as a thermal plastic rubber. A preferred material is commercially available under the trademark Santoporene from Advanced Elastimer Systems L.P. the material should have sufficient tinsel and compression strength to support common restaurant tables and should also be corrosion resistant. In certain applications, it may be desired to provide shallow ribbing on the top and bottom surfaces, but the anti-skid property of the wedge material should generally make such ribbing unnecessary.

Tables may be supported by a plurality of individual legs, each of which may have an adjustable glide 40 or the table top may be supported on a single pedestal 48 as illustrated in FIG. 6. The pedestal may include an X-shaped base 50 as illustrated in FIG. 6, a circular base 52 as illustrated in FIGS. 9 and 10 or a somewhat similar square base which is not illustrated. The wedge 10 of the present invention accommodates all such table supports whether or not they are equipped with adjustable glides 40. FIGS. 6–8 illustrate use of the wedge 10 with a table supported by a pedestal 48 having an X-shaped base 50. When the table wobbles, two of the legs generally remain on the floor and the other two rock up and down. The wedge 10 is typically set on the floor adjacent the end of one of the rocking legs with bottom surface 20 facing the floor and feet 36 facing the glide 40. The bus boy or other attendant need only slide the wedge 10 toward the glide even though the glide cannot be seen under the table leg since the feet 36 will guide the glide 40 onto support surface 30 of cavity 38. The wedge need only be advanced under the glide to the extent that the wobbling is eliminated. Once it is in position, the wedge not only affords vertical support as illustrated in FIG. 8, but the abutment surfaces 32, 34 and 46 also prevent the table from being bumped off of the wedge. If a glide is pushed against one of the abutment surfaces, it will tend to prevent movement of the table or move the wedge with the glide so that it remains supported.

FIGS. 9 and 10 illustrate a tabletop 54 supported on a pedestal 48 equipped with a circular base 52. Whereas such a circular basis may be equipped with glides, this discussion will assume that the circular base 52 is of the type without glides. To stabilize a wobbling table of this type, the wedge 10 is inverted and set on the floor adjacent that portion of the base where the rocking movement is the greatest. Top surface 18 of the wedge engages the floor and bottom surface 20 supports the table base 52. The wedge can simply be pushed with one's foot under the base to the extent that the wobbling is eliminated.

Figure 11:
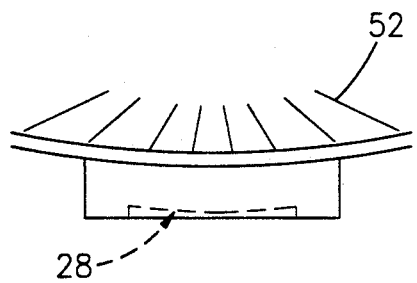
FIG. 11 is a partial end view of the wedge below a circular table base.
Figure 12:
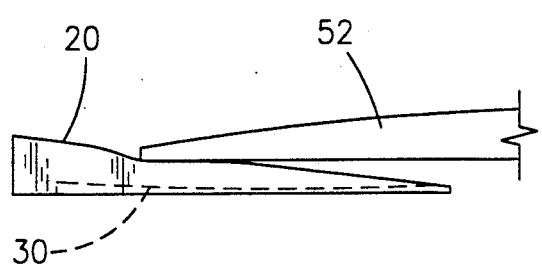
FIG. 12 is a partial detail view of the wedge inserted below a circular table base.

Since the circular base 52 contacts top surface 18 along an arcuate line, the rearward most contact point at the center of the wedge will tend to depress the wedge further than at the sides 22 and 24. Cavity 28 accommodates such depression of the center of the wedge as illustrated in FIGS. 11 and 12. Since the cavity extends longitudinally substantially across the length of the wedge, it is effective at any longitudinal position along the wedge.

Figure 13:
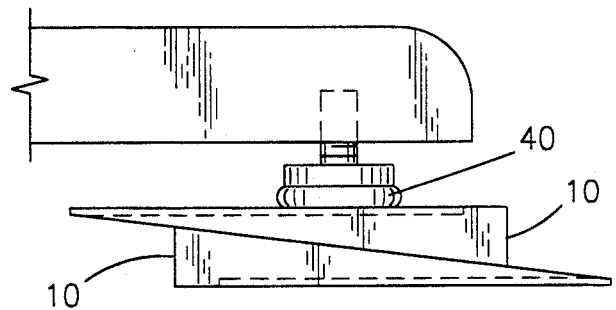
FIG. 13 is a foreshortened side elevational view of a pair of wedges installed below a glide of a table base.

In the event that the needed vertical correction exceeds the height of the wedge 10, a pair of wedges may be used in tandem as illustrated in FIG. 13. The large contact surface between the anti-skid planar bottom surfaces 20 affords secure engagement of the wedges 10 relative to one another.

Figure 14:
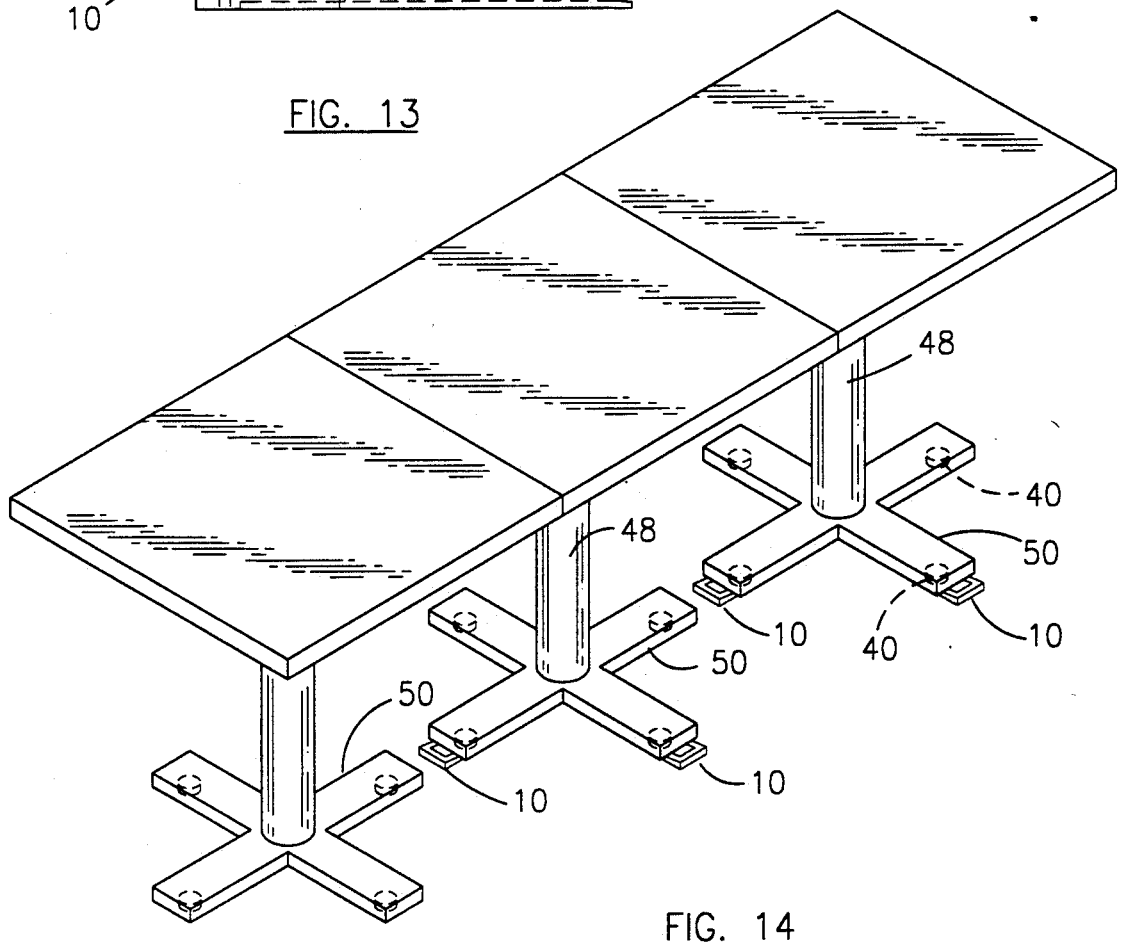
FIG. 14 is a perspective view of several tables joined together and leveled with the wedges of the invention.

FIG. 14 illustrates another use of the wedges 10 of the invention, namely to level a plurality of tables relative to one another when they are joined to form a single larger table. If it is necessary to seat a patron at the crack between two table surfaces, it could be quite annoying to have a ledge which prevents a plate from laying flat on the table. This problem can be solved by elevating the lower table with the use of the wedges 10 of the invention.

When tables are moved, the wedges may be easily picked up and collected if they are not needed at the new table location, or they can be easily reinserted to level the table at its changed position.

Thus there has been shown and described a table of leveling wedge which accomplishes at least all of the stated objects.

I claim:

1. A table leveling wedge for eliminating wobble from tables, with and without glides, on uneven surfaces, said wedge comprising, a solid block of material having forward and rearward ends, a bottom surface, a top surface inclined upwardly and rearwardly relative to said bottom surface and a rear surface connected to and extended between said bottom and top surfaces adjacent the rearward ends thereof, said top surface having a cavity formed therein and extended from the forward end of the block to an extent adjacent to said rearward end, said cavity being defined by an inclined support surface having a front edge and a pair of longitudinally extended and transversely spaced apart abutment surfaces adapted to confine a table glide therebetween, said top surface extending forwardly of said front edge of said support surface to define a pair of feet for receiving a table glide therebetween and generally centering said wedge relative to a glide to be supported on said wedge.

2. The table leveling wedge of claim 1 wherein said support surface is parallel to said top surface.

3. The table leveling wedge of claim 2 wherein the width of said wedge is about 3 and 8 centimeters, the length is between 6 and 12 centimeters and the height is between ½ and 2 centimeters.

4. The table leveling wedge of claim 3 wherein the height of said abutment surfaces is between 1 and 5 millimeters.

5. The table leveling wedge of claim 4 wherein the rearward end of said cavity is spaced forwardly from the rearward end of said block and is defined by a transverse abutment surface adapted to engage a table guide and limit the extent of forward movement of the wedge below a glide.

6. The table leveling wedge of claim 5 wherein said top surface and support surface are generally coplanar.

7. The table leveling wedge of claim 6 wherein said bottom surface is substantially planar.

8. The table leveling wedge of claim 7 wherein the undersides of said feet are coplanar with said bottom surface.

9. The table leveling wedge of claim 8 wherein said abutment surfaces are generally equally spaced from the adjacent sides of said wedge.

10. The table leveling wedge of claim 9 wherein said feet have inner surfaces which taper forwardly and outwardly for guiding a table guide between them.

11. A table leveling wedge for eliminating wobble from tables, with and without glides, on uneven surfaces, said wedge comprising, a solid block of material having forward and rearward ends, a bottom surface, a top surface inclined upwardly and rearwardly relative to said bottom surface and a rear surface connected to and extended between said bottom and top surfaces adjacent the rearward ends thereof, said top surface having a cavity formed therein and extended from the forward end of the block to an extent adjacent to said rearward end, said cavity being defined by an inclined support surface having a front edge and a pair of longitudinally extended and transversely spaced apart abutment surfaces adapted to confine a table glide therebetween, said cavity defining opposite, longitudinally extended top surface portions on said surface each adjacent one of said abutment surfaces;

each of said top surface portions extending forwardly of said front edge of said support surface to partially define a pair of feet for receiving a table glide therebetween and generally centering said wedge relative to a glide to be supported on said wedge; and said support surface and said forwardly extending top surface portions being forwardly tapered to form vertically narrowed front edges such that sliding of said wedge under a table glide to be leveled is facilitated.

* * * * *

UNITED STATES PATENT AND TRADEMARK OFFICE
CERTIFICATE OF CORRECTION

PATENT NO. : 5,249,767
DATED : October 5, 1993
INVENTOR(S) : Floyd F. Mellen

It is certified that error appears in the above-indentified patent and that said Letters Patent is hereby corrected as shown below:

On the title page:

Item: (76) Inventor: change "Floyd E. Mellen" to Floyd F. Mellen".

Abstract, line 6, after "defined", add "by".

Column 3, line 63, change "Santoporene" to "Santoprene".

Column 3, line 64, change "tinsel" to "tensile".

Column 4, line 22, change "38" to "28".

Signed and Sealed this

Tenth Day of January, 1995

Attest:

BRUCE LEHMAN

*Attesting Officer*       *Commissioner of Patents and Trademarks*